T. NEW.
Tanks for Asphaltic Cement.
No. 147,423.  Patented Feb. 10, 1874.
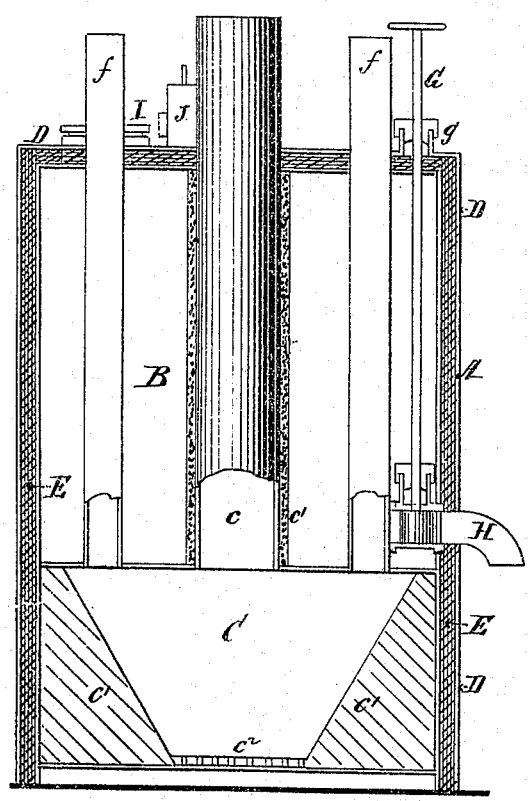
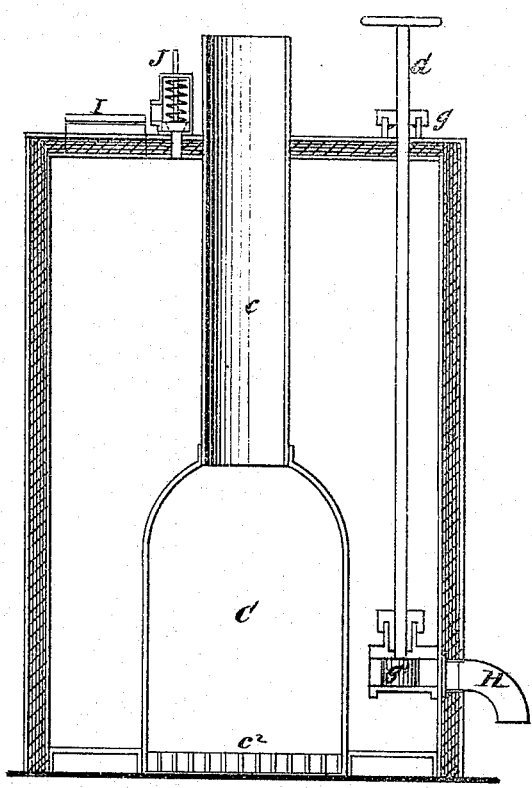
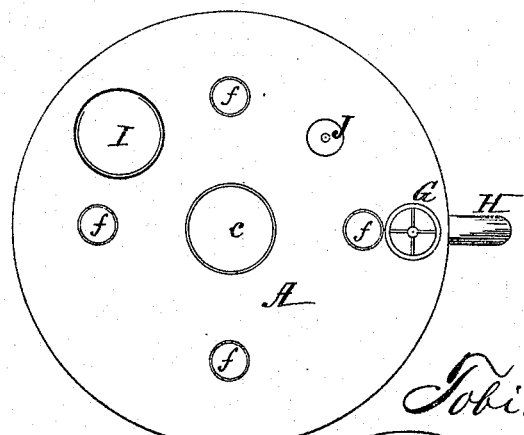
Witnesses:
G. Mathys.
Solon C. Kemon
Inventor:
Tobias New
Per
Attorneys.

UNITED STATES PATENT OFFICE.

TOBIAS NEW, OF NEW YORK, N. Y.

IMPROVEMENT IN TANKS FOR ASPHALTIC CEMENT.

Specification forming part of Letters Patent No. 147,423, dated February 10, 1874; application filed January 9, 1874.

*To all whom it may concern:*

Be it known that I, TOBIAS NEW, of the city, county, and State of New York, have invented a new and Improved Asphaltic-Cement Tank; and I do hereby declare that the following is a full, clear, and exact description of the same, reference being had to the accompanying drawing, forming a part of this specification.

The invention relates to the residuum of coal-tar, which is distilled for its asphalt, so as to furnish a material to be used for roofing, paving, and vault-covers.

After the oils and colors have been extracted at certain temperatures, there results, at a higher temperature of about 650° Fahrenheit, the residuum or asphaltic cement, which is liquid, and then readily drawn off into coolers. As soon as sufficiently cool it is changed to barrels, in which it soon solidifies, and from which it can only be removed by their destruction. Its use, in connection with felt, gravel, or sheathing, necessitates its reduction to a liquid state prior to application; and while subject to the high temperature of the fire, which is necessary to gradually melt down and convert the solid into a liquid, its quality as a cement becomes very much impaired.

To avoid the destruction of the barrels and the deterioration of the cement has long been with me (a practical and every-day user of the asphaltic cement) a desired and great desideratum.

After much thought and expensive experiment, I discovered the means of presenting to the trade this valuable cement with all its original qualities, and without any necessity for the destruction of the barrel or package that contains it.

The invention will first be fully described and then pointed out in the claims.

Figures 1 and 2 of drawing are sectional side elevations, showing a liquid-cement barrel embodying the principle of my invention. Fig. 3 is a plan or top view.

A represents the barrel or package, in which is an asphalt-chamber, B, and a subjacent furnace, C, the latter having the smoke-pipe $c$ extending up through the middle, surrounded by fire-brick $c^1$, and provided with the grate $c^2$. D is a metallic shell, within which and adjacent thereto is a felt lining, E, or equivalent non-conductor of heat. The non-conductor may be placed on the outside, but I prefer to place it within the chamber. The fire-chamber is not only provided with central flue $c$, but preferably, also, with vertical flues $f$ that assist in an equal distribution of heat through the mass of cement, and (the fire being extinguished) in the speedy reduction of the temperature, before use, to about 400° Fahrenheit. G is a hand-rod passing through the packing $g$, and having on lower end the valve $g'$, that fits into the discharge-faucet H. I is an inlet, and J a safety-valve.

Fig. 2 of the drawing represents a modification, which exhibits the general principle of my invention, but which is not by me considered so desirable as that shown in Fig. 1. In this the liquid-cement is brought around an oval fire-pot, and the air-tubes extending through cement-chamber are omitted.

The metallic barrel is made air-tight to prevent the evaporation of the valuable adhesive properties of the cement, and, in conjunction with the inner lining, which is a non-conductor of heat, to prevent the escape of caloric. The asphaltic cement is drawn from the still into these barrels or packages, which are then transferred to a chamber kept always at a suitable temperature, and there held in readiness to be supplied to the trade.

During transportation from one locality to another, in the same or different cities, a small fire is maintained in the furnace only sufficient to make up for the heat that will very slowly escape from the air-tight and heat-protected package. Practically the average of fuel used in the chamber where the barrels are kept in bulk, and in the barrel-furnace during transportation to the building or place of use, will probably not be equal to that now employed to melt the solid asphalt in the open kettles.

My object is to preserve the cement at a temperature of about 365° without the evaporation of its adhesive properties, and have it drawn from the barrel or package by the roofer or paver as he is ready to employ it. When applied under these conditions, it makes the most valuable cement now known to the trade for roofing or paving.

Having thus described my invention, what

I claim as new, and desire to secure by Letters Patent, is—

1. A package for liquid asphaltic cement, consisting of an air-tight shell, a lining of some substance that is a non-conductor of heat, and an inside furnace, to enable the cement to be retained as a liquid, in the manner described.

2. The combination, with chamber B, of the subjacent furnace C, having smoke-pipe passing up through chamber, as and for the purpose set forth.

3. The combination, with chamber B, of the tubes $f$, rising from an air-chamber around the fire-pot, as and for the purpose specified.

TOBIAS NEW.

Witnesses:
FRED L. KANE,
R. B. POWELL.